Dec. 9, 1969 D. L. BAHRS ET AL 3,483,525

INTERCOMMUNICATING MULTIPLE DATA PROCESSING SYSTEM

Filed June 6, 1966

INVENTORS
DAVID L. BAHRS
JOHN F. COULEUR
WILLIAM A. SHELLY
RICHARD L. RUTH

BY William C. Cahill
Arnold E. Renner
Ronald W. O'Keefe

ATTORNEYS

United States Patent Office 3,483,525
Patented Dec. 9, 1969

3,483,525
INTERCOMMUNICATING MULTIPLE DATA PROCESSING SYSTEM

David L. Bahrs, Liverpool, N.Y., and John F. Couleur, Richard L. Ruth, and William A. Shelly, Phoenix, Ariz., assignors to General Electric Company, a corporation of New York Filed June 6, 1966, Ser. No. 555,491
Int. Cl. G11b *13/00;* G06f *15/00*
U.S. Cl. 340—172.5 10 Claims

ABSTRACT OF THE DISCLOSURE

A data processing system including a plurality of data processors and input/output controllers, the latter each being connected to input/output devices. A plurality of memory devices are provided, each connected exclusively to a memory controller and each memory controller connected to each data processor. Communication to the memory being provided exclusively through the connected memory controller and each memory controller responsive to only one of the connected data processors for receiving commands to gain access to the connected memory device.

The present invention pertains to data processing systems, and more specifically, to those systems utilizing multiple data processors and having control means for controlling communication among the subsystems of the data processing system.

A data processing system includes a data processor for manipulating data in accordance with the instructions of a program. The processor will receive an instruction, decode the instruction, and perform the operation indicated thereby. The operation is performed upon data received by the processor and temporarily stored thereby during the operation. The series of instructions are called a program and include decodable operations to be performed by the processor. The instructions of the program are obtained sequentially by the processor and, together with the data to be operated upon, are stored in memory devices.

The memory device may form any of several well-known types; however, most commonly, the main memory is a random access coincident current type having discrete addressable locations each of which provides storage for a word. The word may form data or instructions and may contain specific fields useful in a variety of operations. Normally, when the processor is in need of data or instructions it will generate a memory cycle and provide an address to the memory. The data or word stored at the addressed location will subsequently be retrieved and provided to the data processor.

A series of instructions comprising a program are usually "loaded" into the memory at the beginning of operation and thus occupies a "block" of memory which normally must not be disturbed until the program has been completed. Data to be operated upon by the processor in accordance with the instructions of the stored program is stored in other areas of memory and is retrieved and replaced in accordance with the decoded instructions.

Communication with the data processing system usually takes place through the media of input/output devices including such apparatus as magnetic tape handlers, paper tape readers, punch card readers, remote terminal devices (for time sharing and real time applications specific terminal devices may be designed to gain access to the data processing system). To control the receipt of information from input/output devices and to coordinate the transfer of information to and from such devices, an input/output control means is required. Thus, an input/output controller is provided and connects the data processing system to the variety of input/output devices. The input/output controller coordinates the information flow to and from the various input/output devices and also awards priority when more than one input/output device is attempting to communicate with the data processing system. Since input/output devices are usually electromechanical in nature and necessarily having much lower operating speed than the remainder of the data processing system, the input/output controller provides buffering to enable the processing system to proceed at its normal rate without waiting for the time consuming communication with the input/output device.

The data processing system thus described includes a processor, a memory, an input/output controller, and input/output devices. In many applications it may be found to be advantageous to utilize more than one processor and under most circumstances more than one block of memory may be used. Further, in those system configurations requiring a large number of input/output devices, a number of input/output controllers may be used each controlling a plurality of input/output devices.

To provide flexibility and also to coordinate the communication among the processor, memory device, an input/output controller, a memory controller may be utilized. A memory controller is the sole means of communication among the subsystems of the data processing system and receives requests for access to memory as well as specific requests for communication to other subsystems. The memory controller provides a means for coordinating the execution of operations and transfers of information among the subsystems and may also provide a means for awarding priority when accesses to memory are requested by more than one subsystem.

In systems utilizing plural processors, unique advantages are gained through the use of plural memory controllers. Each of the memory controllers is connected to a different memory device and is also connected to one or more input/output controllers. The transfer of data and instructions throughout the system is facilitated and expedited by the memory controllers through the appropriate awarding of priority and control of access to memory. The multiple memory controllers also individually control communication among the subsystems connected thereto; since the memory controllers may share connection to several subsystems, intercommunication becomes possible. The configuration utilizing multiple data processors and memory controllers effectively yields overlapping data processing systems wherein each system is semi-autonomous and each may execute independent programs. Each input/output controller is provided with means for selecting a particular memory controller as its main memory controller; similarly, each memory controller includes means for selecting a particular data processor as the control processor. By thus appropriately selecting the various subsystems each system of the overlapping systems is chosen to permit the recognition of communication among the subsystems as communication from within the same data processing system. The intercommunication multiple data processing system provides a degree of flexibility unavailable in prior art systems and permits substantial increases in efficiency in the manipulating and transfer of data and instructions.

It is therefore an object of the present invention to provide a data processing system utilizing multiple data processors interconnected by a plurality of memory controllers.

It is also an object of the present invention to provide a data processing system wherein the subsystems of the system may be grouped into overlapping systems.

It is still another object of the present invention to provide a multiple data processing system having a plurality of memory controllers each of which includes means for selecting a predetermined one of the data processors as a control processor thereby defining at least two systems of a multiple data processing system.

It is still another object of the present invention to provide a data processing system wherein a plurality of data processors and input/output controllers are connected to each other and to memory devices exclusively through memory controllers which provide for the orderly communication and transfer of data and instructions.

It is a further object of the present invention to provide a data processing system wherein a plurality of data processors may simultaneously execute independent programs while communicating with each other and with memory through a plurality of memory controllers.

These and other objects of the present invention will become apparent to those skilled in the art as the description proceeds.

Certain portions of the apparatus herein disclosed are not of our invention, but are the inventions of:

David L. Bahrs, John F. Couleur, Richard L. Ruth, and William A Shelly, as defined by the claims of their application, Ser. No. 558,515, filed June 17, 1966;

Harry N. Cantrell and John F. Couleur, as defined by the claims of their application, Ser. No. 563,519, filed July 7, 1966;

Robert Cohen, John F. Couleur, and Richard L. Ruth, as defined by the claims of their application, Ser. No. 563,521, filed July 7, 1966;

Robert Cohen, John F. Couleur, and Wiliam A. Shelly, as defined by the claims of their application, Ser. No. No. 563,522, filed July 7, 1966;

Robert Cohen, William A. Shelly, and Samuel M. Vidulich, as defined by the claims of their application, Ser. No. 567,221, filed July 22, 1966;

David L. Bahrs and John F. Couleur, as defined by the claims of their application, Ser. No. 567,222, filed July 22, 1966;

John F. Couleur and Richard L. Ruth, as defined by the claims of their application, Ser. No. 569,750, filed Aug. 2, 1966;

John F. Couleur, Philip F. Gudenschwager, Richard L. Ruth, William A. Shelly, and Leonard G. Trubisky, as defined by the claims of their application, Ser. No. 577,376, filed Sept. 6, 1966;

John F. Couleur, as defined by the claims of his application, Ser. No. 581,467, filed Sept. 23, 1966; and John F. Couleur, Richard L. Ruth, and William A Shelly, as defined by the claims of their application, Ser. No. 584,801, filed Oct. 6, 1966; all such applications being assigned to the assignee of the present application.

DESCRIPTION OF FIGURES

The present invention may more readily be described by reference to the accompanying drawings in which.

Figure 1:
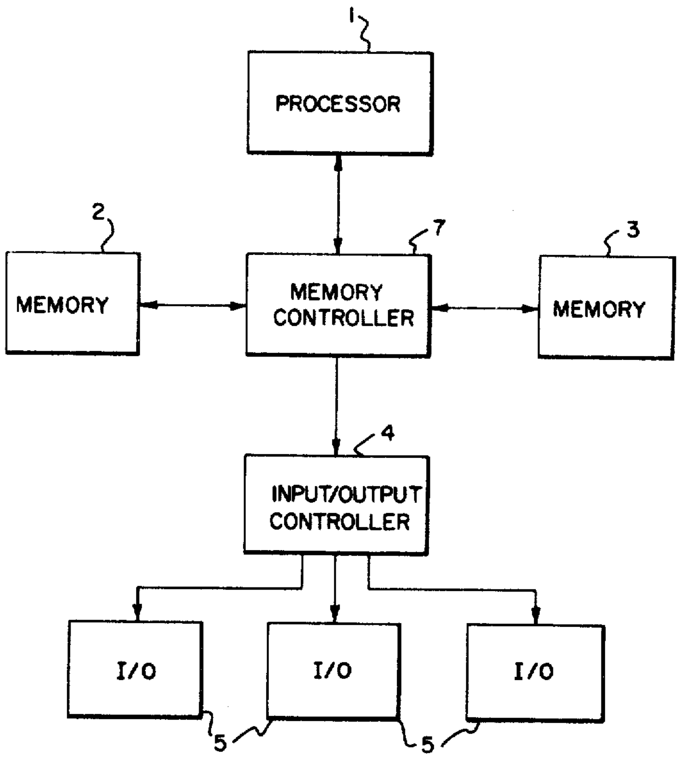
FIGURE 1 is a block diagram of a data processing system in a single memory controller configuration.

For a complete description of the system of FIGURE 1 and of my invention, reference is made to United States Patent No. 3,413,613 issued to David L. Bahrs, John F. Couleur, Richard L. Ruth, and William A. Shelly, on Nov. 26, 1968, and assigned to the assignee of the present invention. More particularly, attention is directed to FIGURES 2–120 and to the specification beginning at column 4, line 32 and ending at column 121, line 42 inclusive of United States Patent No. 3,413,613 which are incorporated herein by reference and made a part hereof.

What is claimed is:

1. An intercommunicating multiple data processing system comprising: a plurality of communicating devices comprising data processors for executing independent programs and for manipulating data in accordance with the instructions of said programs, each data processor including means for generating command signals; a plurality of communicating devices comprising input/output controllers for connection to peripheral devices to control the transfer of data to and from said peripheral devices; a plurality of memory devices for storing data and instructions; a plurality of memory controllers connected to said data processors and to said input/output controllers for receiving and storing data, and each connected to a different memory device for transferring data and instructions to and from said different memory device, each memory responsive to command signals from a different predetermined one of said data processors for providing data stored in a memory device to said predetermined one of said data processors.

2. An intercommunicating multiple data processing system comprising: a plurality of communicating devices comprising data processors for executing independent programs and for manipulating data in accordance with the instructions of said programs, each data processor including means for generating command signals; a plurality of communicating devices comprising input/output controllers for connection to peripheral devices to control the transfer of data to and from said peripheral devices; a plurality of memory devices for storing data and instructions; a plurality of memory controllers connected to said data processors and to said input/output controllers for receiving and storing data, and each connected to a different memory device for transferring data and instructions to and from said different memory device, each memory controller responsive to command signals from a different predetermined one of said data processors for providing data stored in a memory controller to said predetermined one of said data processors; each communicating device including means for generating a memory access request signal, said memory controllers each responsive to a memory access request signal for transferring data from a memory device connected thereto to a communicating device connected thereto.

3. An intercommunicating multiple data processing system comprising: a plurality of communicating devices comprising data processors for executing independent programs and for manipulating data in accordance with the instructions of said programs, each data processor including means for generating command signals; a plurality of communicating devices comprising input/output controllers for connection to peripheral devices to control a transfer of data to and from said peripheral devices, each input/output controller including means for generating a program interrupt signal; a plurality of memory controllers connected to said data processors and to said input/output controllers for receiving and storing data including program interrupt signals and each connected to a different memory device for transferring data and instructions to and from said different memory device, said memory controllers each responsive to the receipt of a program interrupt signal for providing an interrupt present signal to a different predetermined one of the said data processors.

4. An intercommunicating multiple data processing system comprising: a plurality of communicating devices comprising data processors for executing independent programs and for manipulating data in accordance with the instructions of said programs, each data processor including means for generating command signals; a plurality of communicating devices comprising input/output controllers for connection to peripheral devices to control a transfer of data to and from said peripheral devices, each input/output controller including means for generating a program interrupt signal; a plurality of memory controllers connected to said data processors and to said input/output controllers for receiving and storing data including program interrupt signals and each connected to a different memory device for transferring data and instructions to and from said different memory device, said memory controllers each responsive to the receipt of a program interrupt signal for providing an interrupt present signal to a different predetermined one of the said data processors; each communicating device including means for generating a memory access request signal, said memory controllers each responsive to a memory access request signal for transferring data from a memory devices connected thereto to a communicating device connected thereto.

5. An intercommunicating multiple data processing system comprising: a plurality of communicating devices comprising data processors for executing independent programs and for manipulating data in accordance with the instructions of said programs, each data processor including means for generating command signals and for generating a program interrupt signal; a plurality of communicating devices comprising input/output controllers for connection to peripheral devices to control the transfer of data to and from said peripheral devices, each input/output controller including means for generating a program interrupt signal; a plurality of memory controllers connected to said data processors and to said input/output controllers for receiving and storing data including program interrupt signals and each connected to a different memory device for transferring data and instructions to and from said different memory device, said memory controllers each responsive to the receipt of a program interrupt signal for providing an interrupt present signal to a different predetermined one of said data processors.

6. An intercommunicating multiple data processing system comprising: a plurality of communicating devices comprising data processors for executing independent programs and for manipulating data in accordance with the instructions of said programs, each data processor including means for generating command signals and for generating a program interrupt signal; a plurality of communicating devices comprising input/output controllers for connection to peripheral devices to control the transfer of data to and from said peripheral devices, each input/output controller including means for generating a program interrupt signal; a plurality of memory controllers connected to said data processors and to said input/output controllers for receiving and storing data including program interrupt signals and each connected to a different memory device for transferring data and instructions to and from said different memory device, said memory controllers each responsive to the receipt of a program interrupt signal for providing an interrupt present signal to a different predetermined one of said data processors; each communicating device including means for generating a memory access request signal, said memory controllers each responsive to a memory access request signal for transferring data from a memory device connected thereto to a communicating device connected thereto.

7. An intercommunicating multiple data processing system comprising: a plurality of communicating devices comprising data processors for executing independent programs and for manipulating data in accordance with the instructions of said programs, each data processor including means for generating command signals and for generating a program interrupt signal; a plurality of communicating devices comprising input/output controllers for connection to peripheral devices to control the transfer of data to and from said peripheral devices, each input/output controller including means for generating a program interrupt signal; a plurality of memory controllers connected to said data processors and to said input/output controllers for receiving and storing data including program interrupt signals and each connected to a different memory device for transferring data and instructions to and from said different memory device, said memory controllers each responsive to the receipt of a program interrupt signal for providing an interrupt present signal to a different predetermined one of said data processors, each memory controller also responsive to command signals from said different predetermined one of said data processors for providing data stored in a memory device to said predetermined one of said data processors.

8. An intercommunicating multiple data processing system comprising: a plurality of communicating devices comprising data processors for executing independent programs and for manipulating data in accordance with the instructions of said programs, each data processor including means for generating command signals and for generating a program interrupt signal; a plurality of communicating devices comprising input/output controllers for connection to peripheral devices to control the transfer of data to and from said peripheral devices, each input/output controller including means for generating a program interrupt signal; a plurality of memory controllers connected to said data processors and to said input/output controllers for receiving and storing data including program interrupt signals and each connected to a different memory device for transferring data and instructions to and from said different memory device, said memory controllers each responsive to the receipt of a program interrupt signal for providing an interrupt present signal to a different predetermined one of said data processors, each memory controller also responsive to command signals from said different predetermined one of said data processors for providing data stored in a memory controller to said predetermined one of said data processors; each communicating device including means for generating a memory access request signal, said memory controllers each responsive to a memory access request signal for transferring data from a memory device connected thereto to a communicating device connected thereto.

9. An intercommunicating multiple data processing system comprising: a plurality of communicating devices comprising data processors for executing independent programs and for manipulating data in accordance with the instructions of said programs, each data process including means for generating command signals; a plurality of communicating devices comprising input/output controllers for connection to peripheral devices to control a transfer of data to and from said peripheral devices, each input/output controller including means for generating a program interrupt signal; a plurality of memory controllers connected to said data processors and to said input/output controllers for receiving and storing data including program interrupt signals and each connected to a different memory device for transferring data and instructions to and from said different memory device, said memory controllers each responsive to the receipt of a program interrupt signal for providing an interrupt present signal to a different predetermined one of the said data processors, each memory controller also responsive to command signals from said different predetermined one of said data processors for providing data stored in a memory device to said predetermined one of said data processors.

10. An intercommunicating multiple data processing system comprising: a plurality of communicating devices comprising data processors for executing independent programs and for manipulating data in accordance with the instructions of said programs, each data processor including means for generating command signals; a plurality of communicating devices comprising input/output controllers for connection to peripheral devices to control a transfer of data to and from said peripheral devices, each input/output controller including means for generating a program interrupt signal; a plurality of memory controllers connected to said data processors and to said input/output controllers for receiving and storing data including program interrupt signals and each connected to a different memory device for transferring data and instructions to and from said different memory device, said memory controllers each responsive to the receipt of a program interrupt signal for providing an interrupt present signal to a different predetermined one of the said data processors, each memory controller also responsive to command signals from said different predetermined one of said data processors for providing data stored in a memory device to said predetermined one of said data processors; each communicating device including means for generating a memory access request signal, said memory controllers each responsive to a memory access request signal for transferring data from a memory device connected thereto to a communicating device as connected thereto.

References Cited

UNITED STATES PATENTS

| | | | |
|---|---|---|---|
| 3,302,182 | 1/1967 | Lynch et al. | 340—172.5 |
| 3,323,109 | 5/1967 | Hecht et al. | 340—172.5 |
| 3,376,554 | 4/1968 | Kotok et al. | 340—172.5 |
| 3,029,414 | 4/1962 | Schrimpf | 340—172.5 |
| 3,061,192 | 10/1962 | Terzian | 235—157 |
| 3,063,036 | 11/1962 | Seach | 340—172.5 |
| 3,074,636 | 1/1963 | Baker | 235—157 |
| 3,200,380 | 8/1965 | MacDonald | 340—172.5 |
| 3,369,221 | 2/1968 | Lethin | 340—172.5 |

ROBERT C. BAILEY, Primary Examiner

R. B. ZACHE, Assistant Examiner